United States Patent [19]
Dworak et al.

[11] 3,847,519
[45] Nov. 12, 1974

[54] GEAR PUMP ARRANGEMENT

[75] Inventors: Wilhelm Dworak, Stuttgart;
Wolfgang Talmon, Otisheim, both of Germany

[73] Assignee: Robert Bosch GmbH, Stuttgart, Germany

[22] Filed: June 13, 1973

[21] Appl. No.: 369,767

[30] Foreign Application Priority Data
Aug. 12, 1972 Germany.......................... 2239727

[52] U.S. Cl. ................................ 418/126, 418/131
[51] Int. Cl. ............................................ F01c 19/02
[58] Field of Search..................... 418/131, 112, 126

[56] References Cited
UNITED STATES PATENTS

| | | | |
|---|---|---|---|
| 367,374 | 8/1887 | Deming............................. | 418/126 |
| 2,855,854 | 10/1958 | Aspelin............................... | 418/126 |
| 2,996,999 | 8/1961 | Trautman .......................... | 418/126 |
| 3,463,089 | 8/1969 | Newborough...................... | 418/131 |
| 3,597,130 | 8/1971 | Eckerle............................... | 418/126 |
| 3,597,131 | 8/1971 | Schofield ........................... | 418/126 |

*Primary Examiner*—C. J. Husar
*Attorney, Agent, or Firm*—Michael S. Striker

[57] ABSTRACT

The meshing gears of a gear pump are mounted on bearing bodies, and have inlet and outlet regions. Two axially extending strips in the outlet region, crossing the gears and bearing bodies, are subjected to inward fluid pressure and close channels around the gears communicating with the inlet so that inlet and outlet are fluid-tightly separated near the outlet.

11 Claims, 4 Drawing Figures

PATENTED NOV 12 1974  3,847,519

GEAR PUMP ARRANGEMENT

BACKGROUND OF THE INVENTION

The present invention relates to a gear pump with a pair of meshing spur gears, whose shafts are mounted in bearing bores of bearing bodies which are urged by pressure areas toward each other and against the gears.

The German Pat. No. 1,293,598 discloses a gear pump of this type in which parts of the bearing bodies are made slightly resilient by slits extending in various directions. The bearing bodies are pressed against the high pressure outlet of the pump so that circumferential gear portions are in sealing contact with wall portions of the housing of the gear pump. The contact area extends in circumferential direction of the gear over not more than two teeth, while the remaining peripheral portions of the gears are communicating with the suction inlet of the pump through channels in the housing. This pump has the disadvantage that the bearing bodies have to be provided with slits or slots which may cause breakage at an extremely high load. Furthermore, sealing elements, for example O-rings, are required for bounding the pressure areas which effect the sealing of the pump.

SUMMARY OF THE INVENTION

It is one object of the invention to provide a gear pump of the above-described type, which has a simple construction, but excellent sealing properties so that the pump reliably operates.

With this object in view, the present invention provides a pair of strips along which the ends of the teeth of the gears slide in sealing engagement, and which form pressure chambers filled with pressure fluid for urging the strips against the teeth of the gears. The arrangement has the advantage that no special sealing elements are required for sealing the pump chamber. The metal strips seal by abutting the bearing bodies due to the inward directed pressure in the respective pressure chambers. Bearing bodies without slits or slots can be used, so that the metal of the bearing bodies can be selected in accordance with the use of the bearing bodies as bearings for the shaft portions of the gears.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
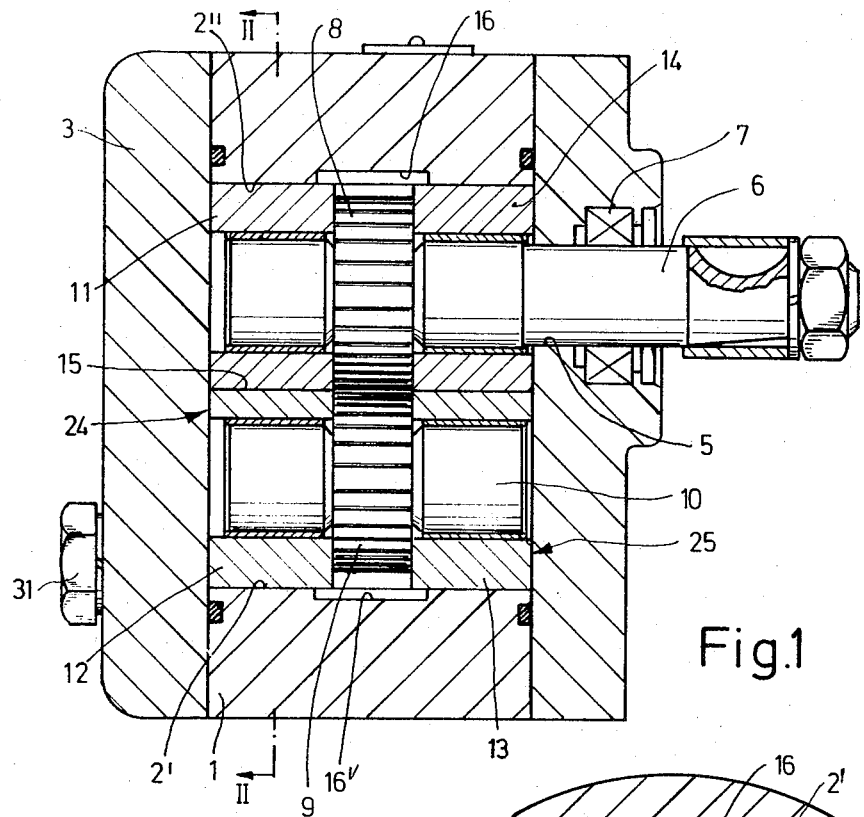
FIG. 1 is an axial sectional view illustrating a gear pump arrangement according to the invention.
Figure 2:
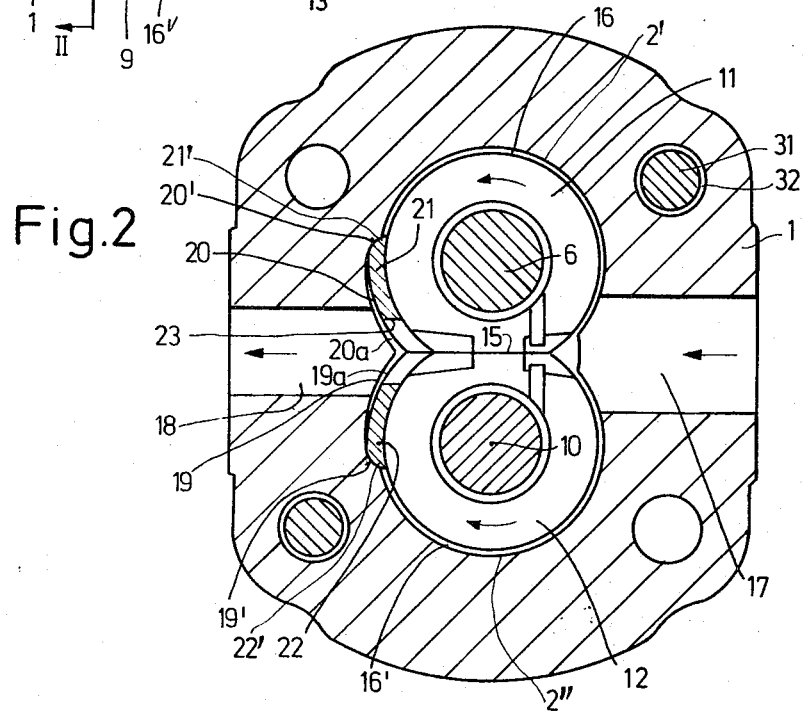
FIG. 2 is a cross-sectional view taken on line II—II in FIG. 1.

Referring now to the drawing, and particularly to FIGS. 1 and 2, a gear pump has a housing which includes a central housing part 1 forming a cavity 2 whose inner surface is formed by two overlapping cylindrical bores 2', 2''. The sides of the central housing part 1 are closed by covers 3 and 4, which are pressed against the housing part 2 by bolts 31 passing through bores 32.

End cover 4 has a bearing bore 5 for the passage of a drive shaft 6, which is sealed by a sealing means 7 by which leakage through bore 5 is prevented.

Figure 4:
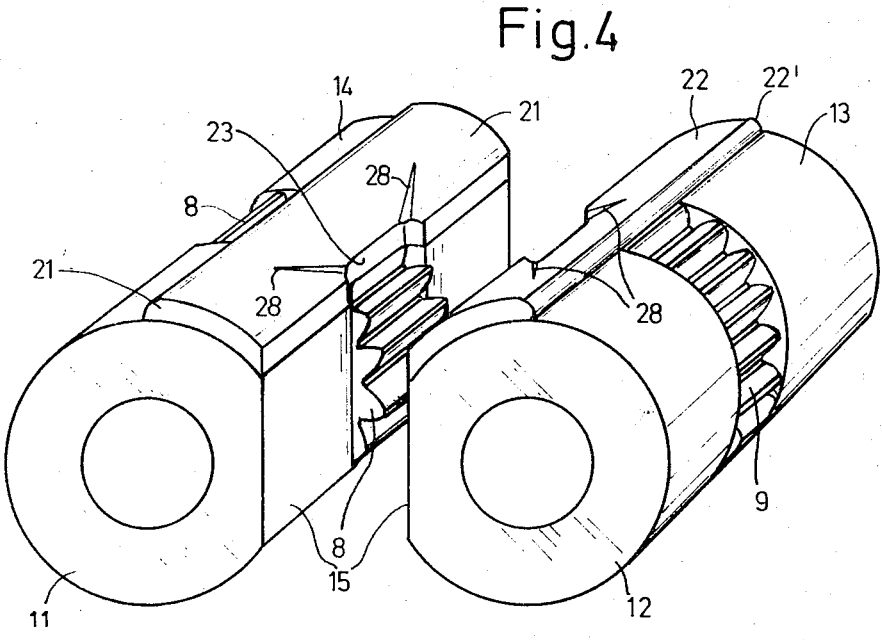
FIG. 4 is a fragmentary perspective exploded view illustrating parts of the gear pump without the housing.

A pair of meshing gears 8, 9 has a pair of shafts 6, 10 which are mounted in pairs of bearing bodies 11, 12 and 14, 13 which are mainly cylindrical bodies, but have abutting planar faces 15, as best seen in FIGS. 2 and 4. The outer partly cylindrical surfaces of the bearing bodies have the same diameter as the overlapping cylindrical bores 2', 2'' in the housing, and fit into the same with very little play.

The addendum circle in the ends of the gears 8, 9 projects a radial distance of 0.03 mm. beyond the outer cylindrical surfaces of the respective bearing bodies 11 to 14.

The bearing bodies 11 to 14 are axially movable to a limited extent on shafts 6 and 10, and laterally pressed against the sides of the gears 8 and 9. The length of the bearing bodies 11 to 14 is selected so that the bearing bodies and the gears 8, 9 have a total length corresponding to the axial length of the cavity 2, with a small amount of axial play.

In the region of the gears 8, 9, channels 16, 16' are formed in the partial bores 2', 2'' which have first ends communicating with the inlet 17, and second ends near the outlet 18. In the outlet region of the gears, where high pressure prevails, the partly cylindrical bores 2', 2'' are provided with grooves 19 and 20 which extend in axial direction on the inner surface of the housing. The grooves 19 and 20 decrease in radial depth toward the ends of the channels 16 and 16', and end in a rounded off portion 19', 20'. In the grooves 19, 20, two metal strips 21, 22 are located which extend across the outer faces of the bearing bodies 11, 14 and 12, 13, as best seen in FIG. 4. The radial thickness of the metal strips 21, 22 is selected in regard to the radial depth of the grooves 19, 20 so that wedge-shaped pressure chambers 19a, 20a are formed which communicate with outlet 18 and are therefore filled with high pressure fluid urging the strips 21, 22 against the peripheries of the bearing bodies so that the cylindrically curved inner surfaces of the strips 21, 22 are in sealing contact with the ends of the teeth of the gears 8 and 9.

The adjacent edges of the transversely curved strips 21, 22 are formed with cutouts 23 which together form an outlet opening, as shown in FIGS. 2 and 4. The other axial edges of strips 21, 22 are rounded off at 21', 22' to fit exactly into the rounded off face portions 19', 20' of the grooves 19, 20. The arrangement is such that the metal strips 21, 22 abut the cylindrical face portions of the bearing bodies before pressure is applied to the pressure chambers 19a, 20a, and the peripheral extension of each metal strip 21, 22 corresponds to three teeth of the respective gear.

Between the end faces of the bearing bodies 11 to 14, and the end covers 3 and 4 of the housing, respectively, a narrow gap 24 and 25 is located which is sealed due to the metallic abutment of the end covers 3, 4 on the housing portion 1.

Figure 3:
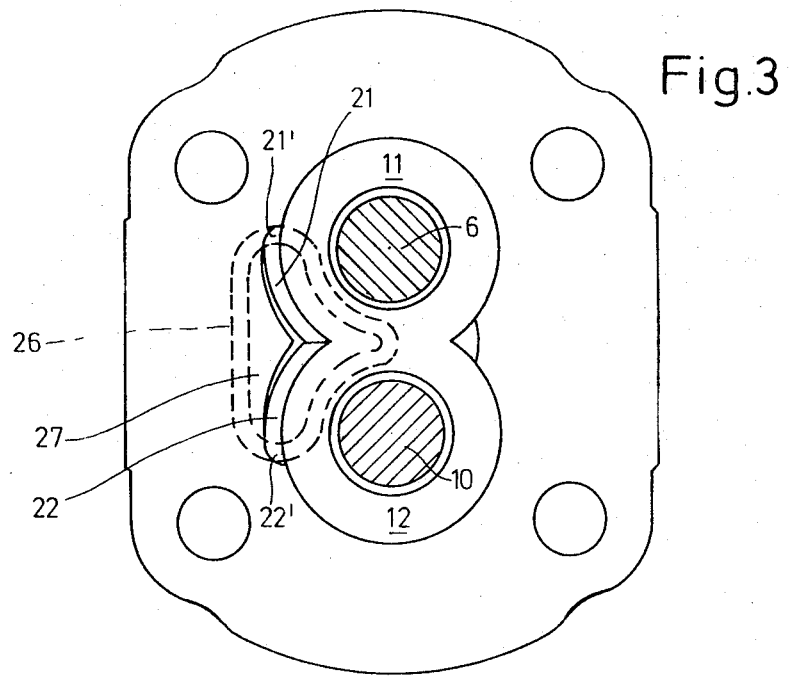
FIG. 3 is a cross-sectional view of the gear pump shown in FIG. 1, with one end cover of the housing removed.

The end covers 3 and 4 have endless grooves, not shown, in which sealing rings 26 are located which form a T-shaped pressure chamber 27, as best seen in FIG. 3. The pressure chamber 27 communicates with the pressure chambers 19a and 20a at the axial ends of the grooves 19, 20 so that the pressure chamber 27 directly communicates with the outlet 18 and with the outlet portion of the gears 8, 9.

During operation, the metal strips 21, 22 are pressed by pressure built up on the outer faces of the strips in the pressure chambers 19a and 20a. Due to the small radial distance of 0.03 mm. which the ends of the teeth of the gears project beyond the peripheries of the bearing bodies 11 and 14, the gears can move under the strips 21, 22 so that the ends of the gear teeth slide along the inner faces of the strips 21, 22, which have part-cylindrical shape.

Due to the channels 16, 16', the ends of the teeth of the gears 8, 9 cannot engage the inner housing surfaces 2', 2'' in the region between the inlet 17 and the strips 21, 22, and friction losses are reduced. The hydraulic pressure which urges the strips 21, 22 against the bearing bodies 11, 14, is produced by a pressure area 19a, 20a which extends over the entire surface of the metal strips 21, 22. No additional sealing elements are required because the strips 21, 22 produce a sealing by metal engagement of the bearing bodies 11 to 14. The pressures in the pressure chambers 19a and 20a urge the strips 21, 22 also apart in circumferential directions of the gears so that the rounded off edges 21' and 22' of the strips 21, 22 seal the ends of the channels 16, 16' by tightly abutting the rounded off portions 19', 20' of the grooves 19 and 20.

The pressure chambers 27 in the gaps 24, 25 urge the bearing bodies 11, 12 and 14, 13 toward each other against the lateral faces of the gears 8 and 9.

In order to improve the resiliency of the strips 21, 22 for guiding the ends of the teeth of the gears 8 and 9, it is advantageous to provide wedge-shaped impressions 28 connected with the outlet opening 23 and forming a star-shaped pattern. It is preferred to make the metal strips 21, 22 of aluminum or of an aluminum alloy. It is evident that the described apparatus cannot only be used as a pump, but also as a hydraulic motor so that the drive shaft by which the gears 8, 9 are driven, is an output shaft for the rotating gears 8 and 9.

It will be understood that each of the elements described above, or two or more together, may also find a useful application in other types of gear pumps differing from the types described above.

While the invention has been illustrated and described as embodied in a gear pump arrangement provided with metal strips for sealing the gears in the high pressure outlet region, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be protected by Letters Patent is set forth in the appended claims.

We claim:

1. Gear pump arrangement, comprising housing means having an inlet and an outlet for a liquid, and forming a cavity between said inlet and said outlet; two pairs of bearing bodies mounted in said cavity; rotary gear means including a pair of meshing gears between said bearing bodies, and two pairs of shaft portions rotatably supported by said bearing bodies, said gears having opposite inlet and outlet regions communicating with said inlet and outlet; said cavity having an endless inner surface formed with a pair of circumferential channels extending around said gears, respectively, and having first ends communicating with said inlet and second ends located near said outlet region; and two resilient metal strips axially extending across said gears and bearing bodies and having radially inner faces fitting on the outer surfaces of said bearing bodies and on the outer ends of the teeth of said gears, and radially outer faces forming two pressure chambers with said inner surface, communicating with said outlet so that said strips are pressed inward exclusively by high pressure liquid and cooperate with the ends of the teeth of said gears in said outlet region while closing said second ends of said channels whereby said inlet and said outlet are fluid-tightly separated by said strips.

2. Arrangement as claimed in claim 1, wherein said inner surface of said housing means is formed with two axial grooves extending across said gears, respectively, and at least partly over said bearing bodies and crossing said second ends of said channels; and wherein said strips are located in said grooves, respectively, and form therein said pressure chambers.

3. Arrangement as claimed in claim 2, wherein said axial grooves and said strips extend over the entire axial length of said bearing bodies and gears.

4. Arrangement as claimed in claim 1, wherein said teeth of said gears project radially beyond the outer surfaces of said bearing bodies at a distance not more than 0.05 mm.

5. Arrangement as claimed in claim 1, wherein said endless inner surface is formed by two overlapping cylindrical surfaces; and wherein the outer surfaces of each bearing body includes a cylindrical face portion, and a planar face portion abutting the planar face portion of the respective other bearing body, said cylindrical face portions fitting into said overlapping cylindrical surface portions, respectively, and said strips being transversely curved to fit on said cylindrical face portions of said outer surface and on the ends of the teeth of said gears.

6. Arrangement as claimed in claim 1, wherein said strips are made of an aluminum alloy.

7. Arrangement as claimed in claim 1, wherein said strips have abutting axially extending adjacent edges having cutouts forming an outlet opening in said outlet region.

8. Arrangement as claimed in claim 7, wherein the edges of said strips remote from said abutting adjacent edges cross said second ends of said channels and close the same.

9. Arrangement as claimed in claim 1, wherein said strips cover peripheral surface portions of said gears, respectively, having not more than three teeth.

10. Arrangement as claimed in claim 1, wherein the ends of the teeth of said gears are spaced from said inner surface of said housing means in the regions of said channels.

11. Arrangement as claimed in claim 7, wherein said radially outer faces of said strips are provided with wedged-shaped impressions forming a star-shaped pattern and communicating with said outlet opening to improve the resiliency of said strips.

* * * * *